United States Patent
Bourvellec et al.

(10) Patent No.: US 12,290,976 B2
(45) Date of Patent: May 6, 2025

(54) DEVICE FOR CONVEYING PREFORMS AND METHOD FOR CONTROLLING SUCH A DEVICE IN ORDER TO ANGULARLY INDEX THE PREFORMS IN A REFERENCE POSITION

(71) Applicant: SIDEL PARTICIPATIONS, Octeville-sur-Mer (FR)

(72) Inventors: Loïc Bourvellec, Octeville-sur-Mer (FR); Stéphane Morin, Octeville-sur-Mer (FR); Sébastien Fevre, Octeville-sur-Mer (FR)

(73) Assignee: SIDEL PARTICIPATIONS, Octeville-Sur-Mer (FR)

( * ) Notice: Subject to any disclaimer, the term of this patent is extended or adjusted under 35 U.S.C. 154(b) by 377 days.

(21) Appl. No.: 17/415,943

(22) PCT Filed: Dec. 19, 2019

(86) PCT No.: PCT/FR2019/053197
§ 371 (c)(1),
(2) Date: Jun. 18, 2021

(87) PCT Pub. No.: WO2020/128359
PCT Pub. Date: Jun. 25, 2020

(65) Prior Publication Data
US 2022/0063171 A1    Mar. 3, 2022

(30) Foreign Application Priority Data
Dec. 19, 2018   (FR) ...................................... 1873409

(51) Int. Cl.
*B29C 49/42* (2006.01)
*B29C 49/64* (2006.01)
(Continued)

(52) U.S. Cl.
CPC ...... *B29C 49/4205* (2013.01); *B29C 49/6409* (2013.01); *B29C 49/42119* (2022.05); *B29K 2067/003* (2013.01); *B29L 2031/7158* (2013.01)

(58) Field of Classification Search
CPC ............ B29C 49/4205; B29C 49/6409; B29C 49/42119; B29C 49/42085;
(Continued)

(56) References Cited

U.S. PATENT DOCUMENTS

| 5,681,521 A | 10/1997 | Emmer et al. |
| 5,780,069 A * | 7/1998 | Suzuki ................ B29C 49/6409 |
| | | 425/526 |

(Continued)

FOREIGN PATENT DOCUMENTS

| DE | 102014118292 A1 | 6/2016 | |
| WO | WO-2011121007 A1 * | 10/2011 | ......... B29C 49/4205 |

(Continued)

OTHER PUBLICATIONS

International search report dated May 27, 2020.

*Primary Examiner* — Gene O Crawford
*Assistant Examiner* — Abby A Jorgensen
(74) *Attorney, Agent, or Firm* — Blake T. Hudson

(57) ABSTRACT

A method of controlling a device for conveying thermoplastic material preforms for use in a heat treatment oven and such a device for conveying preforms including at least one principal wheel and one auxiliary wheel at least one of which is driven in rotation to move at least one transport device to which are connected in movement holding device each configured to cooperate with a preform. In example embodiments, the holding device is adapted to be actuated relative to a preform- or vice versa-between an inactive position and an active holding position. In example embodi- (Continued)

ments, the at least one principal wheel of the conveyor device includes electric actuators that selectively drive at least in rotation the holding device in such a manner as to index said preform in a reference position.

20 Claims, 10 Drawing Sheets

(51) Int. Cl.
 *B29K 67/00* (2006.01)
 *B29L 31/00* (2006.01)
(58) Field of Classification Search
 CPC .......... B29C 49/42095; B29C 49/6436; B29C 49/685; B29K 2067/003; B29L 2031/7158
 See application file for complete search history.

(56) References Cited

U.S. PATENT DOCUMENTS

| | | | |
|---|---|---|---|
| 6,125,996 A | 10/2000 | Cornet et al. | |
| 7,284,778 B1 | 10/2007 | Pellegatta | |
| 7,694,802 B2 | 4/2010 | Lapert | |
| 9,539,755 B2 | 1/2017 | Morin et al. | |
| 10,046,507 B2 | 8/2018 | Morin et al. | |
| 2003/0077349 A1 | 4/2003 | Derouault | |
| 2003/0168782 A1* | 9/2003 | Suzuki | B29C 49/4205 425/529 |
| 2008/0166445 A1* | 7/2008 | Baumgarte | B29C 49/4205 425/526 |
| 2012/0089252 A1 | 4/2012 | Kwirandt | |
| 2015/0111162 A1 | 4/2015 | Huettner | |
| 2021/0122061 A1 | 4/2021 | Morin et al. | |

FOREIGN PATENT DOCUMENTS

| | | | | |
|---|---|---|---|---|
| WO | WO-2014030639 A1 * | 2/2014 | ............ | B29C 49/06 |
| WO | WO-2015072506 A1 * | 5/2015 | ............ | A61L 2/04 |
| WO | WO-2016116266 A1 * | 7/2016 | ............ | B29C 49/06 |
| WO | 2017060654 A1 | 4/2017 | | |
| WO | 2019048238 A1 | 3/2019 | | |

* cited by examiner

[Fig. 1]
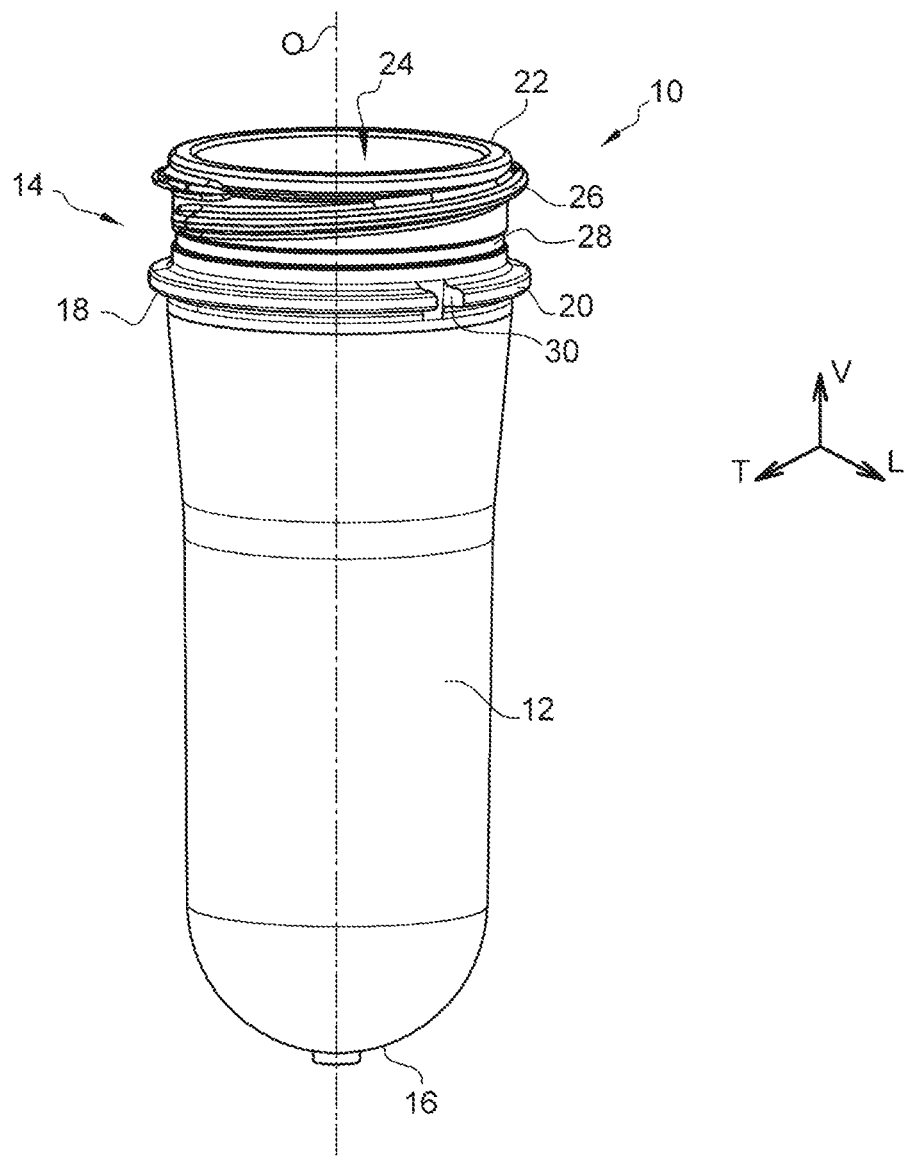

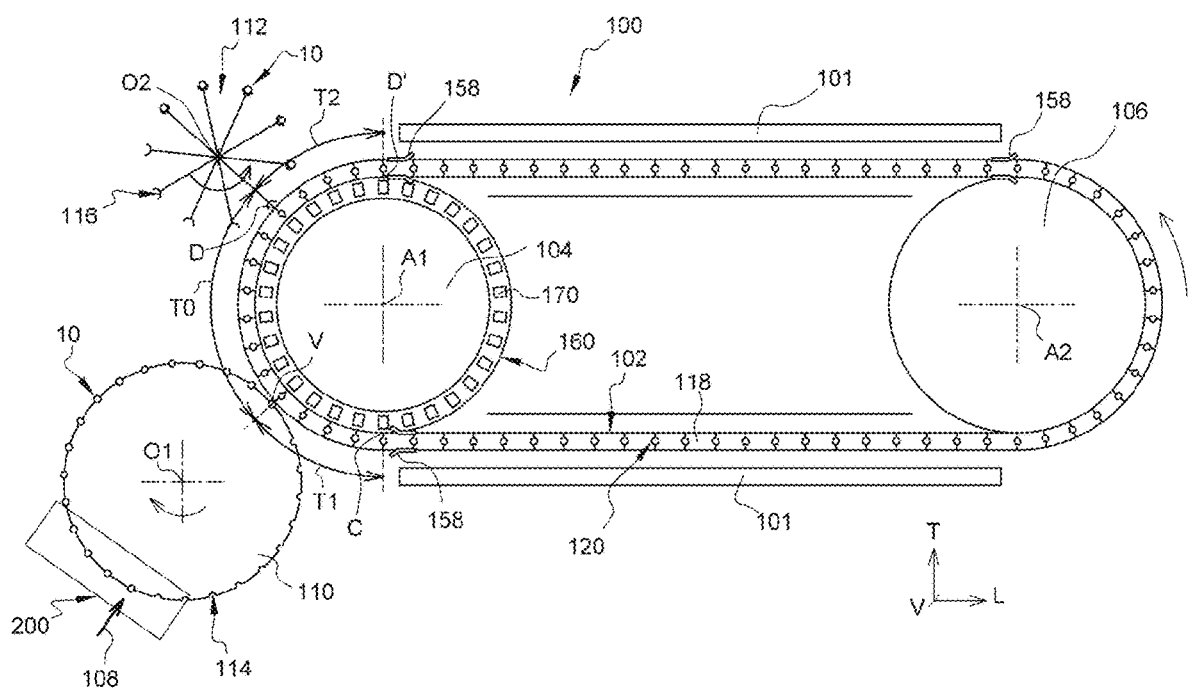
[Fig. 2]

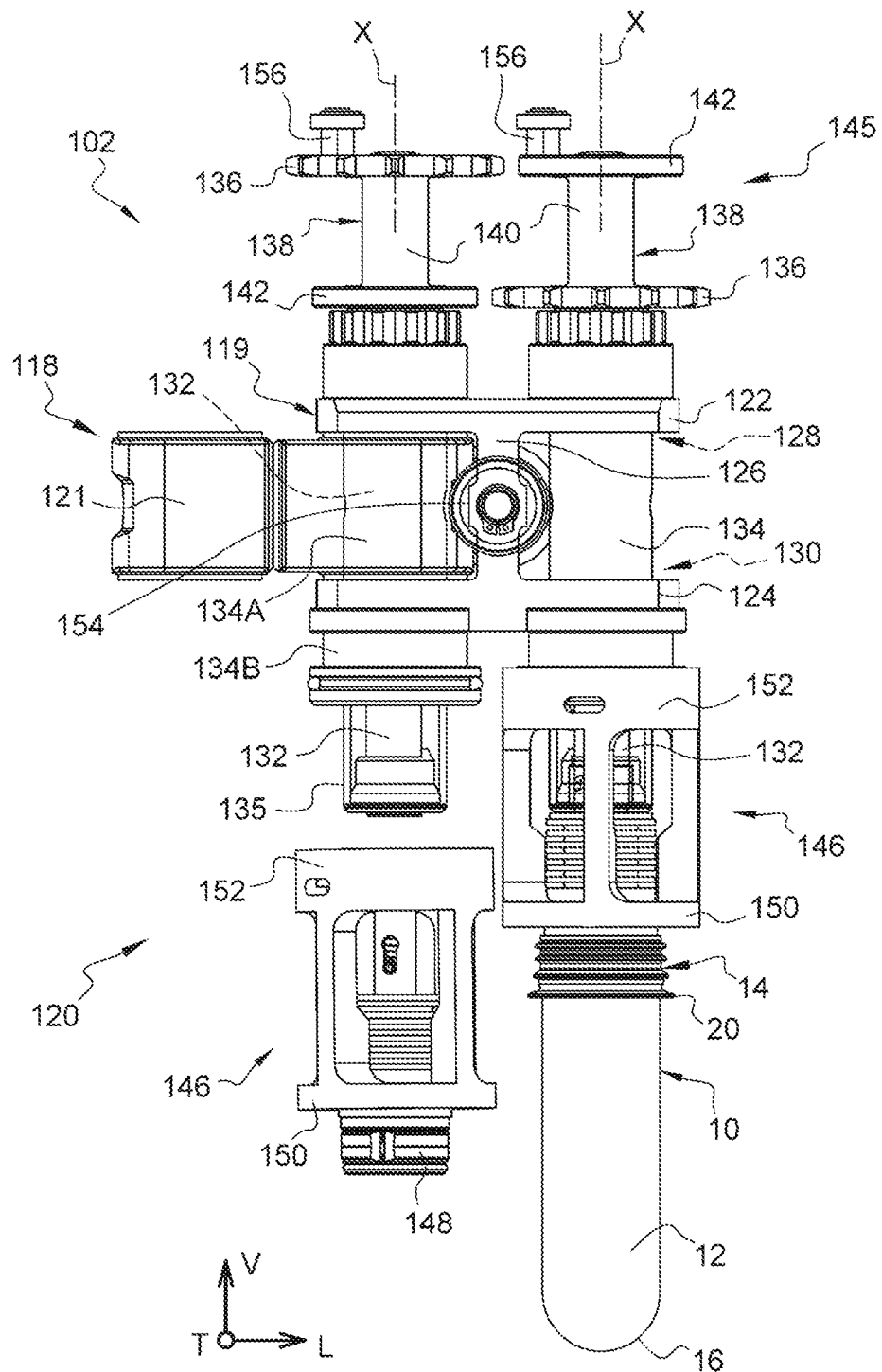
[Fig. 3]

[Fig. 4]
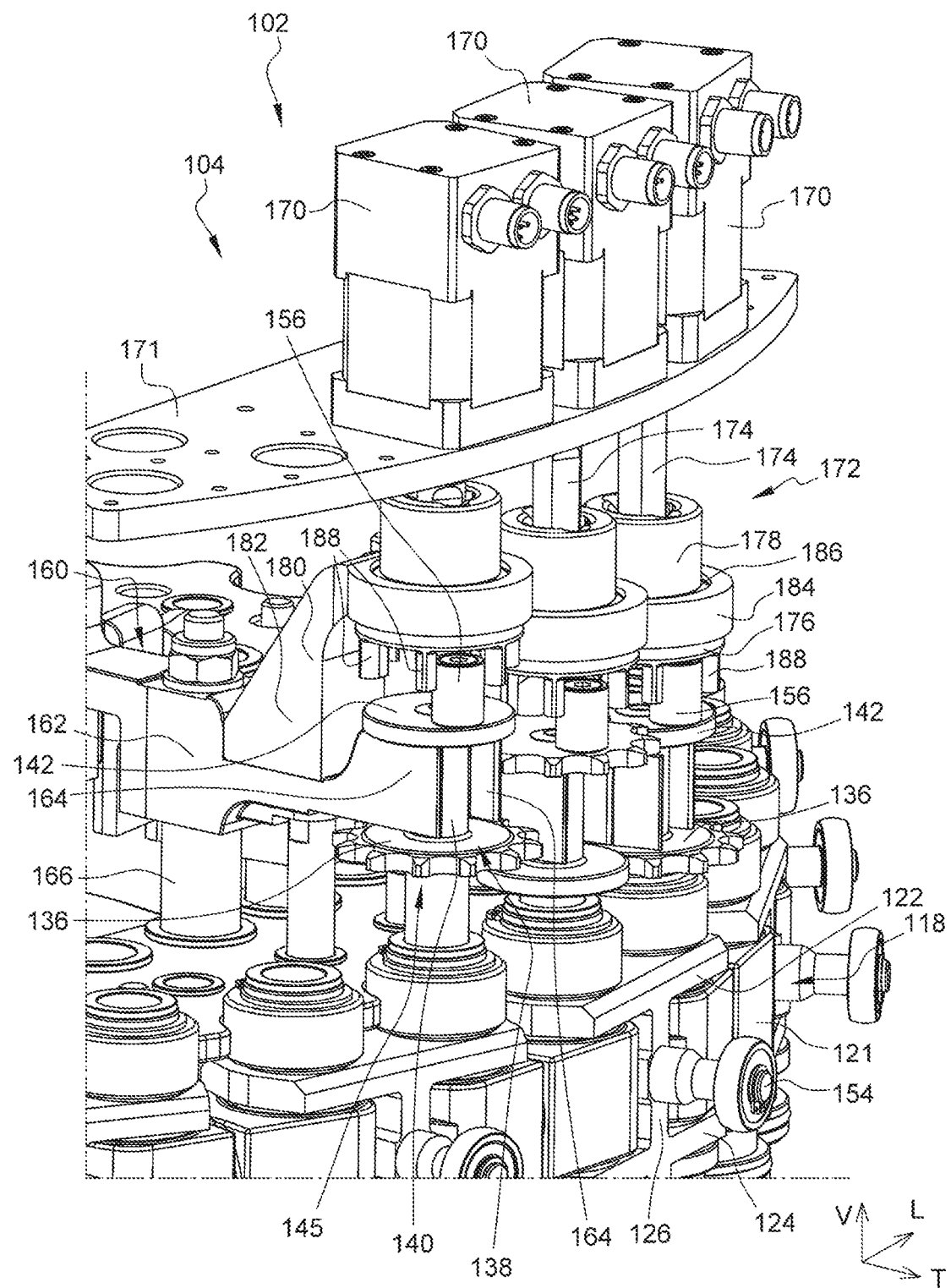

[Fig. 5]
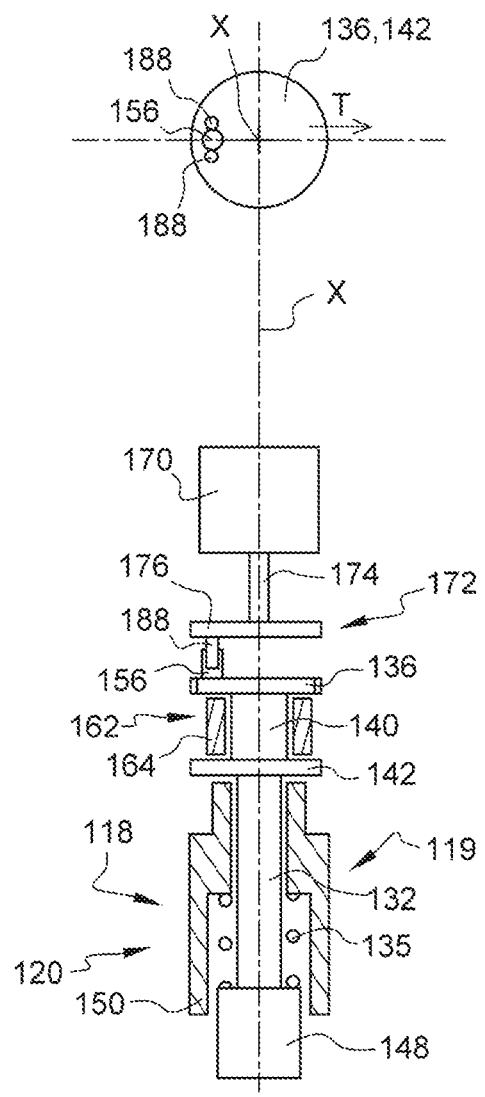

[Fig. 6]
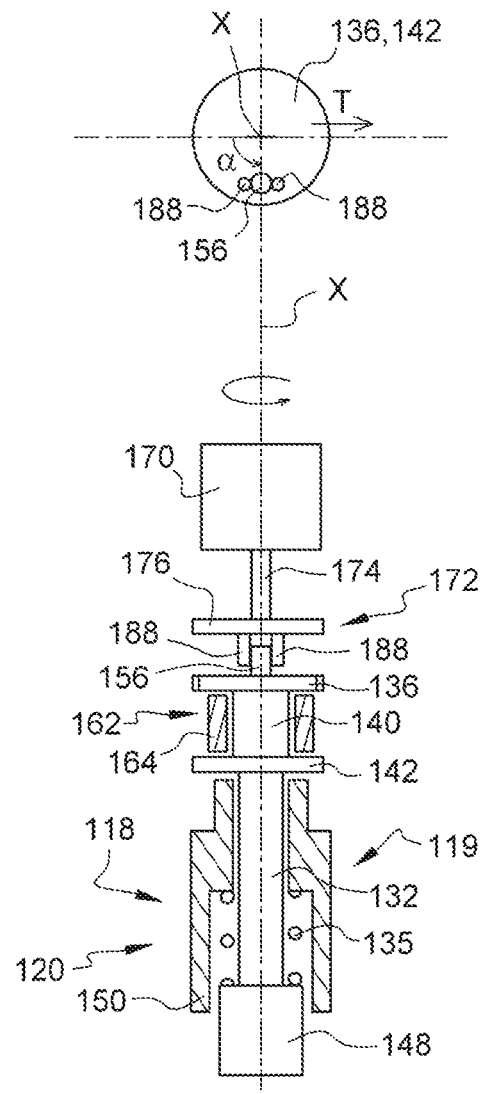

[Fig. 7]
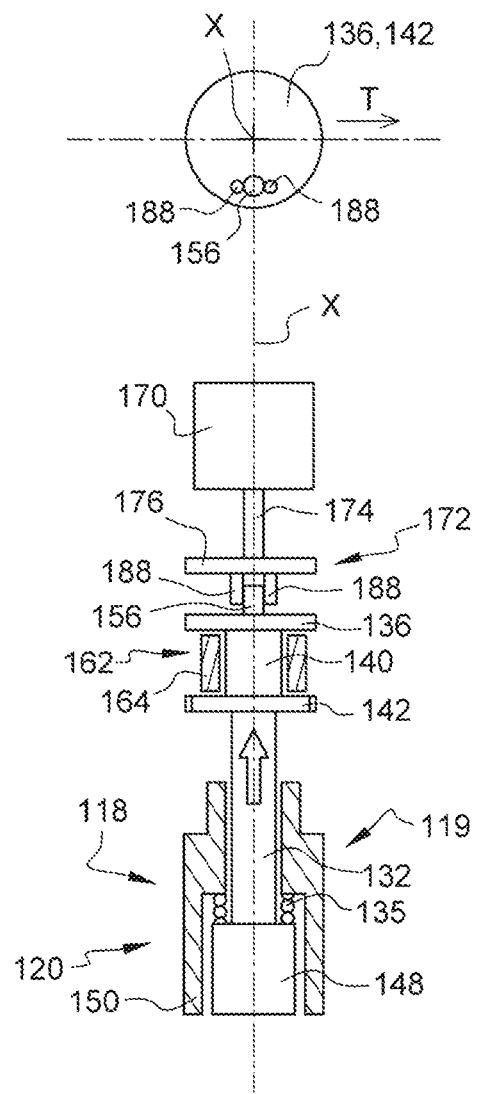

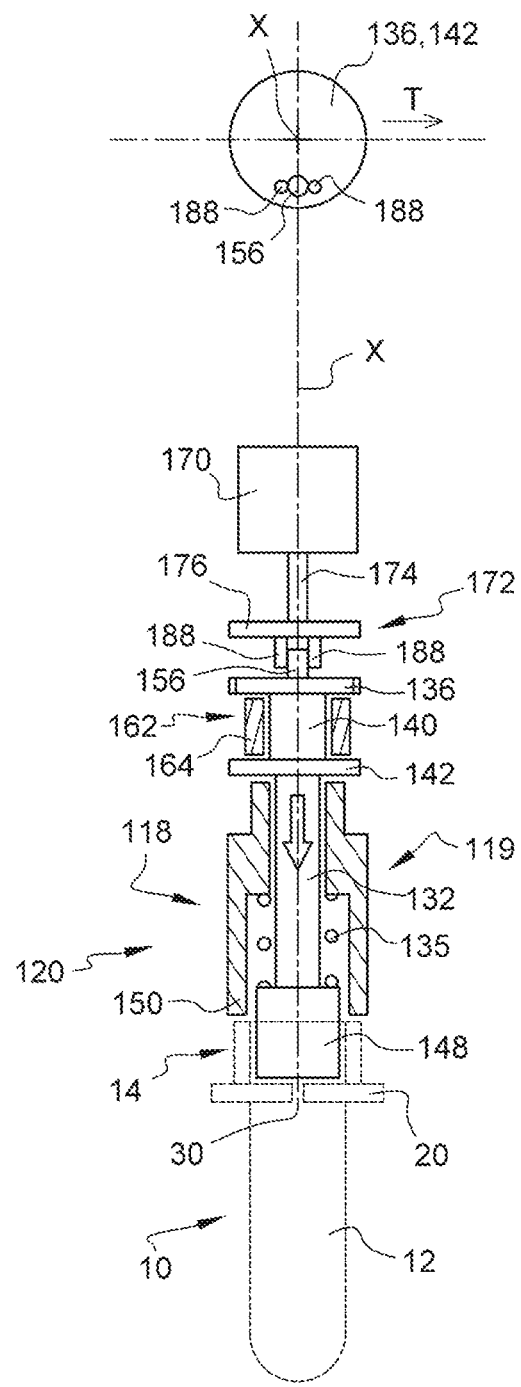
[Fig. 8]

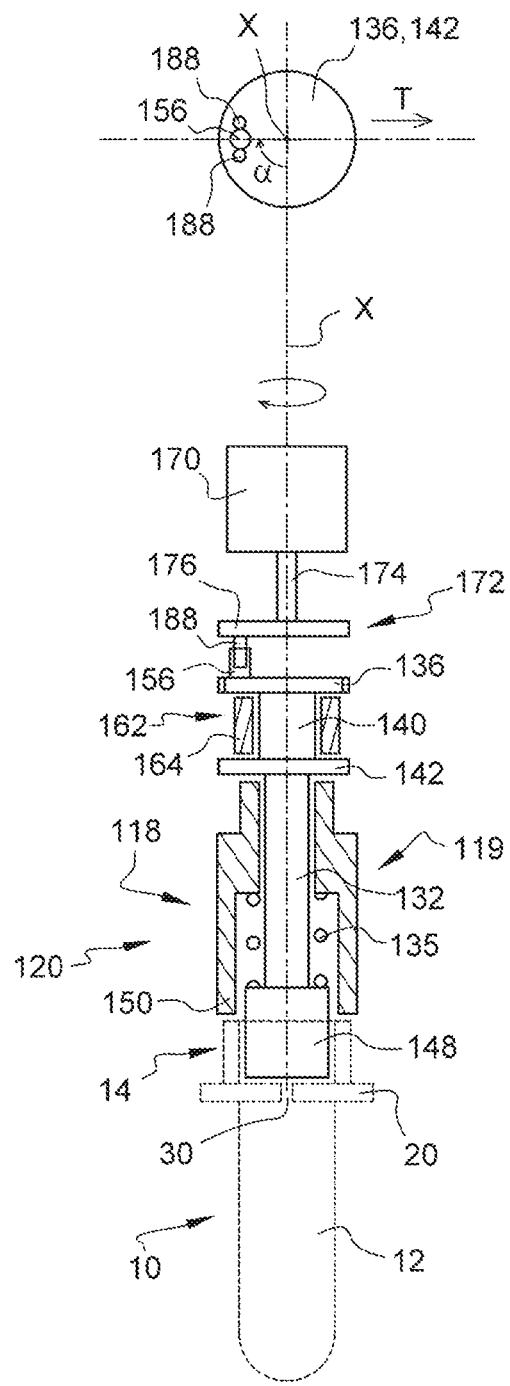
[Fig. 9]

[Fig. 10]
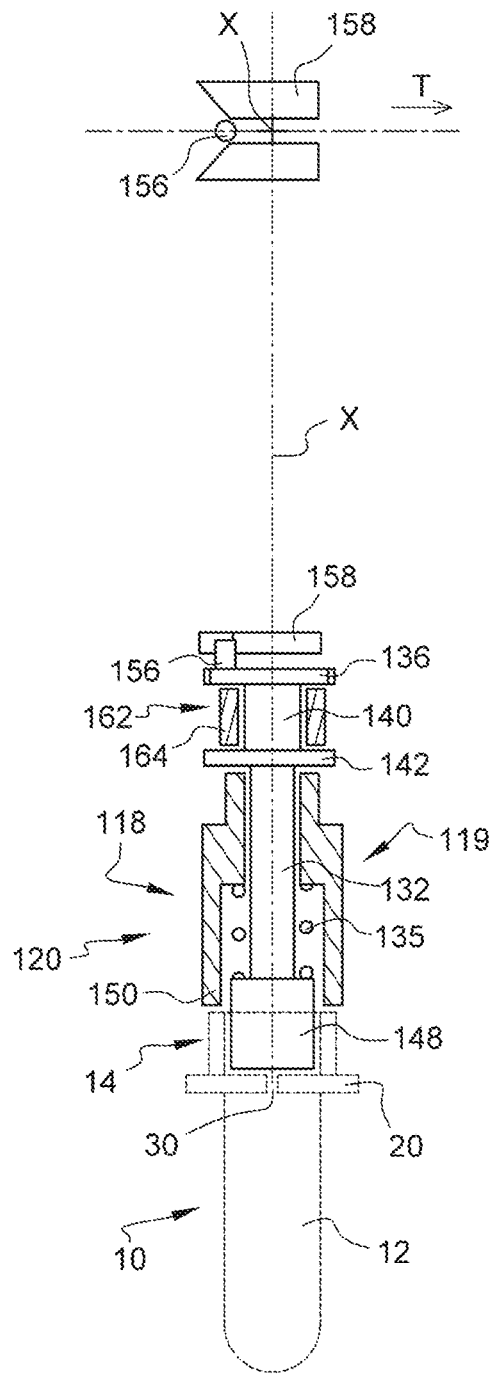

DEVICE FOR CONVEYING PREFORMS AND METHOD FOR CONTROLLING SUCH A DEVICE IN ORDER TO ANGULARLY INDEX THE PREFORMS IN A REFERENCE POSITION

TECHNICAL FIELD OF THE INVENTION

The invention concerns a device for conveying thermoplastic material preforms for use in a heat treatment oven and a method of controlling a device of that kind for angularly indexing each of the preforms in a specific reference position.

The invention more particularly concerns a device for conveying thermoplastic material preforms for use in a heat treatment oven, said device for conveying preforms including at least one principal wheel and one auxiliary wheel at least one of which is driven in rotation to move at least one transport means to which are connected in movement holding means each configured to cooperate with a preform, said holding means being adapted to be actuated relative to a preform—or vice versa—between an inactive position and an active holding position.

The invention also concerns a method of controlling a thermoplastic material preform conveying device of that kind for use in a heat treatment oven.

TECHNICAL BACKGROUND

There is moreover meant by "preform" a blank that is obtained by injection molding a thermoplastic material, in particular PET (polyethylene terephthalate).

A preform includes a globally cylindrical hollow body closed by a hemispherical bottom at one end and open at the opposite end via a neck having its final shape as well as, generally, a radial flange projecting at the junction of the neck with the body.

There are known from the prior art numerous examples of a conveyor device of this kind for transporting thermoplastic material preforms in a heat treatment oven in an installation for manufacturing containers, in particular but not exclusively bottles.

A device for conveying preforms inside an oven is designed to transport a stream of preforms in the upstream to downstream direction along a heating path along at least one part of which means for heating the body of the preforms by radiation are arranged.

The document WO-2017/060654 describes and represents one embodiment of a preform conveyor device for use in a heat treatment oven.

The conveyor device includes at least one transport means such as a chain including a plurality of links each having a plate on which said means for holding a preform are mounted.

Thus, there are known numerous embodiments of means for holding a preform by its neck equipping a transport device, such holding means being also termed "spindles" ("tournettes" in French).

For embodiments of a "spindle" of this kind for preforms, reference may be had in a nonlimiting manner to the documents WO-00/48819, WO-2014/135631, EP-1.880.825 or EP-3.228.438 in the name of the Applicant.

According to the document WO-2017/060654, the spindle forming the holding means comprises a bush fixed to the plate and a mandrel provided with a holding head.

The mandrel is mounted to be mobile in translation relative to the bush between an inactive position in which the head is accommodated in the bush and an active position in which the head projects relative to a lower face of the bush, in particular so as to come to be fixed in the neck of a preform.

In a first application example, using what is referred to as conventional heating, the holding means are driven in rotation by means of a rack that meshes with a pinion that includes drive means having the overall shape of a bobbin that are rigidly attached to the mandrel during the movement in translation of the transport chain over at least one part of the heating path in the oven.

As a result, the preform fixed on the head of the mandrel is transported in the oven and driven in rotation on itself so as fully to expose the body to radiation type heating means, such as infrared lamps or laser diodes.

A transport chain of this kind is usually mounted between a principal wheel and an auxiliary wheel, at least the principal wheel being a driving wheel in order to drive said transport chain in a closed loop.

The structure of a transport chain of this kind is for example described in European patent EP-0.935.572 (Sidel) to which reference should be had for fuller details.

The movement in translation of the holding means, more particularly of the mandrel, between said inactive and active positions is generally driven by actuator means including an actuator fork that is driven in movement by means of a cam and roller mechanical system.

The actuator means carry out an operation of loading the preforms onto the conveyor device and then an offloading operation.

In a second application example, using what is termed preferential heating, and by comparison with the first application example, the holding means (or spindles) are not driven in rotation to cause the preform to rotate on itself, the preform being indexed angularly around its axis in a specific reference position.

By way of nonlimiting example reference may be had to the document WO-94/23932 that describes this kind of method of heat treatment of preforms that is termed "preferential heating".

A "preferential heating" type method is more particularly used when the final container to be obtained is not an approximately circular cylinder, such as for example containers having a polygonal cross section that includes one or more approximately plane faces or containers with a flattened body (for example bottles with a spray gun).

In a "preferential heating" type method selective heating is employed to create on the body of the preform one or more relatively hotter zones that alternate circumferentially with interleaved relatively less hot zones.

The objective is that the relatively hotter zones are deformed more easily than the others during the molding of the body of the preform by blowing or by stretching-blowing to obtain the container.

To control the selective heating of the body of the preform and to obtain the hotter or less hot zones a reference position of the preform is determined for which said hotter or less hot zones have the required angular distribution around the principal axis of the preform as a function of the container to be produced.

In the installations of the Applicant used for the production of this kind of thermoplastic material containers the preforms are indexed, that is to say angularly oriented, in a reference position inside the heat treatment oven of the installation.

In the case of a tunnel type oven having a "U" shape heating path, the indexing of the preforms is performed on a first rectilinear section of the heating path, termed the penetration section, which thereafter includes a curvilinear second section, termed the stabilization section, and a rectilinear third heating section, termed the distribution section.

Although globally satisfactory, this kind of indexing of the preforms effected inside the oven has certain drawbacks.

Among these drawbacks is the fact that the selective heating of the body of the preforms can begin only once the preform has been indexed in said reference position, that is to say only on the part of the heating path remaining to be traveled after indexing. This is the reason why selective heating of the body of the preforms is effected in the rectilinear third heating section, termed the distribution section.

Now, as a function of the containers to be produced, the second or distribution section of the heating path of the oven sometimes proves of insufficient length to obtain on the body said hotter or less hot zones resulting from the selective heating.

Indexing the preforms inside the oven combined with selective heating in accordance with the preferential heating method therefore sometimes necessitates the use of ovens having a longer heating path, that is to say ovens of larger size.

Indexing the preform inside the oven also necessitates use of a transport device including preform holding means that can be disengaged in order to be able selectively to drive in rotation or not each preform about its principal axis, depending on the application.

Nonlimitingly, the document WO-00/48819 describes one example of such holding means for conveying preforms inside an oven.

In fact, each preform is successively driven in rotation about its axis until it is indexed in the reference position after which the support means are disengaged to interrupt the driving thereof in rotation in such a manner as to retain the preform indexed in said reference position and to begin the selective heating of the body.

Using such disengageable support means contributes to limiting the maximum container production throughput that can be achieved.

Moreover, increasing the accuracy achieved in the indexing of the preforms is also attempted in order to enhance the quality of the containers produced.

The object of the invention is in particular to propose a new solution for angularly indexing the preforms in a reference position inside an oven remedying at least some of the drawbacks of the known solutions, in particular to obtain fast, precise and reliable indexing of a high throughput of preforms.

SUMMARY OF THE INVENTION

To this end, the invention proposes a device for conveying thermoplastic material preforms for use in a heat treatment oven of the type described above characterized in that said principal wheel of the conveyor device includes electric actuators that selectively drive at least in rotation said holding means in such a manner as to index said preform in a reference position.

By indexing is meant orienting the preform angularly about its axis in said reference position which is in particular determined relative to indexing means on the preform, preferably on the neck.

The electric actuators on the principal wheel of the oven advantageously further enable indexing of each of the preforms in said reference position upstream of the rectilinear first or so-called penetration section, thanks to which the entirety of the heating path inside the oven can be used for preferential heating.

The electric actuators advantageously enable angular indexing of the preform to be obtained that is fast, precise and reliable and above all at high throughputs, greater than the throughputs obtained previously.

In accordance with other features of the invention:
the electric actuators on the principal wheel each include connecting means that are configured to cooperate with drive means of said holding means in such a manner as to drive said holding means in rotation;
the connecting means include a rod and a connecting tip, the rod being connected in rotation to said electric actuator and to said connecting tip;
the drive means of said holding means include at least means for driving the holding means in rotation;
the drive means of said holding means include at least one member for angularly positioning said holding means intended to enable indexing of the preform in said reference position;
the connecting means include rotation drive means configured to cooperate with said positioning member;
said actuator means are formed by a mechanical system of the cam and roller type that drives in movement at least one actuator member adapted to cooperate with the drive means of the holding means to drive said holding means in translation between the active holding position and the inactive position;
said actuator means are formed by said electric actuators that are adapted to drive said holding means in translation between the active holding position and the inactive position;
said electric actuators each consist of a linear rotary actuator such as a LinMot® type motor;
the LinMot® type motor includes a linear motor and a rotary motor that are adapted to be driven independently of one another;
each electric actuator includes connecting means that are configured to cooperate with the drive means of the holding means in such a manner as to drive said holding means in rotation and in translation.

The invention also proposes a method of controlling a device for conveying thermoplastic material preforms for use in a heat treatment oven, said device including at least one principal wheel and one auxiliary wheel at least one of which is driven in rotation to move at least one transport means to which are connected in movement holding means each configured to cooperate with a preform, said holding means being adapted to be actuated relative to a preform—or vice versa—between an inactive position and an active holding position, in which at least said principal wheel includes electric actuators associated with said holding means that selectively drive at least in rotation said preform holding means including indexing means for indexing said preform in a reference position, said control method including at least one pre-positioning step, carried out between an offloading point and a loading point of the principal wheel, consisting in selectively driving the electric actuator in rotation to pre-position angularly the holding means at an angle with a value previously determined as a function of the random position of the indexing means of said preform.

The control method advantageously includes at least one detection step, carried out before the loading of a preform, consisting in detecting the indexing means of said preform occupying a random position in such a manner as to determine the value of said angle to be used during the pre-positioning step.

Said detection step is preferably carried out using a detection system including optical type recognition means.

Alternatively, said detection step is carried out using a detection system including electromechanical type recognition means.

The control method advantageously includes a loading step carried out at the loading point consisting in selectively actuating the holding means to carry out the loading of the preform occupying said random position.

The control method advantageously includes at least one indexing step carried out between principal wheel loading and decoupling points consisting in the electric actuator driving the associated holding means in rotation in order to index the preform in said reference position.

When a positioning member in the drive means of said holding means occupies a so-called critical position after the step of indexing said preform in said reference position the control method advantageously includes an intervention step consisting in the electric actuator driving the holding means in rotation in order to offset said holding means angularly in such a manner as to quit said critical position.

The control method advantageously includes at least one correction step carried out between the principal wheel coupling and offloading points consisting in selectively driving the holding means in rotation through a given angle to correct a positional drift relative to said reference position of the preform.

BRIEF DESCRIPTION OF THE FIGURES

Other features and advantages of the invention will become apparent on reading the following detailed description, to understand which reference will be made to the appended drawings, in which:

FIG. 1 is a perspective view that represents one embodiment of a thermoplastic material preform and illustrates indexing means for indexing the preform in a reference position formed by a notch in a radial flange;

FIG. 2 is a view from above that schematically represents one part of an installation for manufacturing containers including a heat treatment oven and illustrates a preform transport device in that kind of oven that includes a principal wheel including electric actuators adapted to index the preforms in a specific reference position;

FIG. 3 is a side view that represents one part of a transport means to which preform holding means are connected in movement and illustrates on the left a removable holding tip before mounting and another holding tip that has been mounted and is in an active position fixed in the opening of a neck of a preform;

FIG. 4 is a perspective view that represents one part of a preform conveyor device in accordance with one embodiment of the invention and illustrates the principal wheel thereof on which are mounted electric actuators adapted to drive the holding means selectively in rotation via connecting means cooperating with the drive means of said holding means;

FIG. 5 is a schematic view that represents three drive means of the preform holding means in the (empty) state in which they are found after the offloading point and illustrates the finger in the so-called "trailing" initial position corresponding to the reference position for a preform;

FIG. 6 is a schematic view analogous to FIG. 5 that represents the drive means of the preform holding means in the state in which they are found after the pre-positioning step and illustrates the position of the finger after it is driven by the electric actuator through a particular angle as a function of an angle determined as a function of the random position of the means for indexing the preform;

FIG. 7 is a schematic view analogous to FIGS. 5 and 6 that represents the drive means of the holding means in the state in which they are found before the operation of loading a preform and illustrates the driving of the holding means in translation toward the inactive position by the actuator means;

FIG. 8 is a schematic view analogous to FIGS. 5 to 7 that represents the drive means of the holding means in the state in which they are found at the point of loading the preform and illustrates the finger and the indexing means aligned radially thanks to the pre-positioning step carried out after the step of detecting said indexing means;

FIG. 9 is a schematic view analogous to FIGS. 5 and 8 that represents the drive means of the holding means in the state in which they are found after the step of indexing the preform and illustrates the preform in the reference position;

FIG. 10 is a schematic view analogous to FIGS. 5 to 9 that represents the drive means of the holding means in the state in which they are found after the decoupling point and illustrates rails forming guide means adapted to cooperate with the finger to guarantee that the preform occupies said reference position before its introduction into the first or penetration heating section of the heating path inside the oven.

DETAILED DESCRIPTION OF THE INVENTION

In the remainder of the description nonlimiting longitudinal, vertical and transverse orientations will be adopted that are referred to the trihedron (L, V, T) represented in the figures.

By convention, fixed longitudinal and transverse orientations relative to the axis of a preform or the rotation axis of a wheel are determined.

Also and nonlimitingly the terms "front" and "rear" will be used with reference to the longitudinal orientation, the terms "upper" and "lower" or "top" and "bottom" will be used with reference to the vertical orientation, and finally the terms "left" and "right" will be used with reference to the traverse orientation.

The terms "interior" or "exterior" and "internal" or "external" are used in a general manner with respect to a preform or a wheel, in particular to designate an element situated either inside or outside the preform.

The terms "upstream" and "downstream" are used with reference to the stream of preforms transported in the upstream to downstream direction.

There has been represented in FIG. 1 one particular embodiment of a thermoplastic material preform 10.

The preform 10 is advantageously produced by injection molding a thermoplastic material, in particular PET.

In known manner, this kind of thermoplastic material preform 10 is intended to be transformed subsequently into a container, such as a bottle or a pot. However, here the term "container" nonlimitingly designates this kind of final container as well as a so-called intermediate container.

The production of containers is for example carried out in a production installation (not represented) in which the thermoplastic material preform 10 is heated in a heat treatment oven 100.

One example of a heat treatment oven 100 forming one of the units of this kind of production installation is illustrated in FIG. 2, which will be described later.

The heat treatment of the preform 10 in the oven 100 is carried out before its transformation into a container by blowing (or by stretching-blowing) inside the mold of a molding unit and by means of at least one pressurized fluid, generally air.

The preform 10 has a principal axis O that here extends in the vertical direction of the trihedron (L, V, T) represented in FIG. 1.

The preform 10 includes a body 12 which, extending vertically along the axis O, is connected at one end to a neck 14 and is closed at the opposite end by a bottom 16.

The neck 14 includes a bearing surface 18 by means of which the preform 10 can be supported.

The neck 14 of the preform 10 advantageously includes at least one flange 20 that extends radially in a plane (L, T) of the trihedron. The flange 20 is situated in a junction zone of the neck 14 with the body 12 and projects radially outward, in particular relative to the body 12.

The bearing surface 18 of the preform 10 is preferably formed by a lower face of said radial flange 20.

The neck 14 includes an upper edge (or lip) 22 that circumferentially delimits an access opening 24 to the interior of the body 12 of the preform 10. Here the body 12 has a globally cylindrical shape.

In this embodiment the neck 14 includes on the outside a thread 26 intended to allow subsequent closure of the container, for example by a screw cap or a fixing ring for screwing on a spray gun.

The neck 14 further includes an annular groove 28 adjacent to the flange 20 that is for example intended to receive a tamper-evident ring that is temporarily rigidly attached to a screw cap, until the container is opened.

In a variant that is not represented the bearing surface 18 may consist of a part of the thread 26.

The foregoing description of the preform 10 is equally valid for a container obtained from this kind of preform provided in particular that the neck 14 is identical, said neck 14 having its final shape.

In fact, it is pointed out that the neck 14 having its final shape, only the body 12 of the preform 10 is heated in the heat treatment oven 100 of a container production installation.

For some applications it is necessary to be able to index or to orient the preform 10 angularly in a particular geometric position termed the reference position.

This will for example be the case for a preform 10 when the heating of the body 12 of the preform 10 in the heat treatment oven 100 is not uniform in order to allow a container to be obtained having a particular shape, in particular a non-cylindrical shape.

As will also be the case for a container, such as for example a bottle, to the neck of which is screwed a spray gun that has to occupy a particular position, generally aligned relative to the flattened body of the flask.

This is the reason why the preform 10 includes indexing means 30 intended to allow angular positioning relative to its axis O of the preform 10 in said reference position.

The neck 14 having its final shape, said indexing means 30 advantageously allow angular positioning of a preform 10 and subsequently the container (bottle, etc.) obtained from this kind of preform.

Said means 30 for indexing the preform 10 are preferably arranged at the level of the neck 14.

The indexing means 30 include at least one indexing element intended to allow indexing of the preform 10 in said reference position.

As illustrated in FIG. 1, here the indexing means 30 are of female type and for example consist of at least one notch.

The notch is preferably formed in the radial flange 20, or alternatively in the thread 26.

In a variant that is not represented the indexing means 30 are of male type, such as a lug forming said at least one indexing element and projecting for example above the radial flange 20.

The male type indexing means 30 are preferably produced in one piece with the flange 20 of the preform 10.

Male or female indexing means 30 of this kind are given by way of nonlimiting example. In fact, the thread present on the neck could equally be used for indexing the preform 10.

More generally, the means 30 for indexing the preform 10 in a reference position will further depend on the detection means, for example the optical or electromechanical detection means, that are employed to detect them in order thereafter to be able to index said preform 10.

The heat treatment oven 100 for thermoplastic material preforms 10 such as that illustrated in FIG. 1 will now be particularly described with reference to FIG. 2.

The oven 100 includes radiation type heating means 101 intended to heat the body 12 of the preforms 10 conveyed inside the oven.

In the example from FIG. 2 the oven 100 is of the "tunnel" type in which the preforms 10 follow a "U" shaped heating path in the upstream to downstream direction.

The path includes in succession a rectilinear first heating section, termed the penetration section, a curvilinear second section (with no heating), termed the stabilization section, and a rectilinear third heating section, termed the distribution section.

Respective heating means 101 are arranged on the two heating sections of the path.

The preform 10 is preferably transported through the installation and more particularly conveyed in the oven 100 in a so-called "neck up" position with a vertical orientation corresponding to that represented in FIG. 1.

In a variant that is not represented the preform 10 is conveyed in an inverted, so-called "neck down" position in the oven 100, which then includes means for turning over the preforms arranged at the entry and at the exit of the heating path.

The oven 100 includes a device 102 for conveying preforms 10 including at least one principal wheel 104 and one auxiliary wheel 106 at least one of which is driven in rotation.

The principal wheel 104 and the auxiliary wheel 106 have respective rotation axes A1 and A2.

The principal wheel 104 is preferably driven in rotation by a motor (not represented) and the auxiliary wheel 106 is coupled in rotation to said principal wheel 104.

The oven 100 is fed with preforms 10 by a feeder device 108, here in FIG. 2 represented schematically by an arrow, that includes at least one first, so-called entry transfer wheel 110 having a rotation axis O1.

A second, so-called exit transfer wheel 112 having a rotation axis O2 is adapted to transport the preforms 10 downstream of the heat treatment oven 100.

The hot preforms 10 are in particular transported by the second transfer wheel 112 in the downstream direction as far as a molding unit (not represented), or "blower", in which each preform 10 is transformed into a container by blowing or by stretching-blowing it in a mold.

The first transfer wheel 110 is provided with a plurality of notches 114 that are regularly distributed circumferentially around the rotation axis O1.

The second wheel 112 for transferring the preforms 10 to the molding unit includes pincers 116, here mounted at the free end of a plurality of arms, said pincers 116 being opened and/or closed mechanically by a cam and roller system, for example.

The preforms 10 are transported inside the oven 100 between said transfer wheels 110, 112 by a conveyor device 102.

The device 102 for conveying the preforms 10 includes at least one transport means 118 one embodiment of which is illustrated in part in FIG. 3.

The transport means 118 preferably includes at least one chain (or belt) on which holding means 120 are mounted.

The conveyor device 102 therefore includes a plurality of holding means 120 which are coupled in movement to the transport means 118 formed by the chain that is intended to be driven in a closed loop by the principal wheel 104 and by the auxiliary wheel 106.

The structures of this kind of transport means 118 and holding means 120 are well known, for example from the aforementioned documents WO-2017/060654 and EP-0.935.572.

As illustrated in FIG. 3, the transport means 118 include a mobile support 119 intended to be articulated with other mobile supports (not represented) that are identical by articulation links 121 in such a manner as to form a closed transport chain.

Here the mobile support 119 includes a horizontal upper plate 122 and a horizontal lower plate 124 that are connected by a transverse vertical central core 126.

Each of the plates 122, 124 includes two orifices 128, 130, each orifice 128 of the upper plate 122 coinciding vertically with an orifice 130 of the lower plate 124.

The holding means or "spindles" 120 include a shaft 132 mounted to rotate in the mobile support 119 about an axis X extending vertically in accordance with the trihedron (L, V, T) represented in FIG. 3.

Each shaft 132 is rotatably received in the coinciding orifices 128, 130 associated with the support 119.

The two shafts 132 are arranged in a similar manner on the support 119. In this regard, the arrangement of a single shaft 132 will be described hereinafter, that arrangement being applicable to the other shaft 132.

In a known manner a flexible closed chain is produced by alternating supports 119 and articulation links 121, each support 119 being mounted to pivot about the axis X of the upstream shaft 132 associated with the preceding articulation link 121.

A sleeve 134 is radially disposed between each shaft 132 and the support 119. Each sleeve 134 is fixedly mounted relative to the support 119 whereas the shaft 132 is mounted to rotate and to slide axially in the sleeve 134.

The sleeve 134 has a tubular upper section 134A of substantially constant diameter that passes through the two orifices 128, 130 and a lower section 134B forming a downwardly flared skirt.

The lower section 134B extends below the lower plate 124 of the support 119. A radial functional space allowing rotation of the shaft 132 in the sleeve 134 is provided between an internal wall of the tubular section 134A and a cylindrical external face of the shaft 132.

At an upper end the shaft 132 is provided with a pinion 136 constrained to rotate with it.

The pinion 136 is integral with a bobbin shaped part 138 that includes a shaft 140 at one axial end of which the pinion 136 extends and, opposite the latter, a flange 142 of smaller diameter than the pinion 136.

Depending on the application, the pinion 136 is intended to mesh with a rack (not represented) that extends along a part of the heating path, so as to drive the shaft 132 in rotation.

The bobbin shaped part 138 is also constrained to slide axially with the shaft 132.

Each shaft 132 is guided in rotation relative to the support 119 by at least two upper and lower rolling bearings that are not visible in FIG. 3 and are for example ball bearings.

The shaft 132 is mounted to slide axially to allow actuation of the holding means 120 between an active holding position illustrated on the right in FIG. 3 and an inactive position (not represented) in which the shaft 132 is driven to slide upward relative to said active position.

The shaft 132 is preferably urged elastically toward the active holding position of said holding means 120 by a return member, here a coil spring 135.

The means 120 for holding a preform 10 therefore include drive means 145 further comprising the pinion 136, the bobbin 138 including the shaft 140 and the flange 142 that are rigidly attached to the shaft 132.

The drive means 145 of the holding means 120 are configured to enable driving of the movement thereof between said inactive and active holding positions both in rotation and in translation.

One embodiment of the means 120 for holding a thermoplastic material preform 10 will be described hereinafter.

The shaft 132 is preferably intended to carry at its lower end a removable, so-called "spindle tip" 146 that includes at its lower end a member 148 for holding the preform 10 by its neck 14.

Here the holding member 148 is a mandrel that is mounted coaxially with the shaft 132 and provided with elastic means (not represented), such as an O-ring, advantageously made of an elastic material and the outside diameter of which is equal to or slightly greater than the inside diameter of the neck 14.

The holding member 148 formed by the mandrel is configured to support the preform 10 by friction against the internal wall of the neck 14 when in the active holding position, said holding member 148 being inserted in the neck 14 during the so-called loading operation.

The holding member 148 is advantageously intended to be fixedly mounted on the shaft 132 by quick fixing means, preferably by elastic nesting of complementary shapes as in bayonet or ball type fixing means.

The tip 146 further includes an extractor plate 150 that is mounted to slide axially relative to the holding member 148. The extractor plate 150 includes a central passage that allows the holding member 148 to be passed under the plate 150 in the active position of the holding means 120 and above the plate 150 in the inactive position.

The plate 150 is fixed to the lower section 134B of the sleeve 34 by axially nesting with an upper ring 152 that is fixed on top of the plate 150.

The plate 150 is intended to come to bear on an upper edge 22 of the neck 14 of the preform 10 when the holding member 148 is moved upward in order to allow its extraction from the neck 14 during the so-called offloading operation.

The support 119 is advantageously driven between two rolling orientations by a cam follower 154 that is intended to cooperate through contact with a cam section (not represented) of helical shape arranged upstream and downstream of the heating sections of the oven 100 followed by the supports 119. Here the cam follower 154 is a roller that is mounted to rotate about a transverse axis on the core 126 of the support 119.

The rotary shaft 132 is free to turn about its axis X when a support 119 of the transport means 118 is moved inside the oven along a portion of the path on which the pinion 136 does not mesh with a rack.

In the case of a preferential heating type application it is necessary to master perfectly the angular orientation of the preforms 10 about their axis O to preserve the indexing in a reference position from their entry into the oven 100 until they are transformed into a container.

Moreover, to guarantee that the shaft 132 does not remain immobilized in a non-indexed angular position, it is known to provide mechanical monitoring means adapted to restart rotation of the shaft 132 relative to the support 119 that are operative when the pinion 136 is not engaged with a rack.

The mechanical monitoring means include a vertical finger 156 (sometimes also referred to as a roller) that is arranged at the upper end of the bobbin shape part 138 and projects vertically upward relative to the flange 142 or the pinion 136.

The finger 156 is eccentric relative to the axis X of the shaft 132, and to be more precise the finger 156 is eccentric longitudinally and rearwardly when said holding means 120 coupled to the shaft 132 occupy said reference position corresponding to a position in which the finger (or roller) 156 is said to be "trailing".

Each finger 156 is able to cooperate with guide means 158 that are advantageously configured to position said finger 156 automatically in the so-called "trailing" position corresponding to the reference position.

As represented schematically in FIG. 2, the guide means 158 consist for example of a pair of rails having an initial portion that is open in a "V" shape, that is to say a funnel shape, and then, in the direction of movement of the supports 119, a final portion toward which the rails converge.

The rails 158 are arranged on either side to delimit between them a calibrated passage for the finger 156 which, in the event of an angular offset relative to said reference position, comes into contact with one of the rails, which automatically causes the shaft 132 to be rotated, thanks to which the holding means 120 are angularly oriented to occupy said reference position.

In other words, the close together ends of the two rails 158 are sufficiently far apart to allow the finger 156 to pass without striking them if the holding means 120 are occupying said reference position.

By way of nonlimiting example reference may be made to the documents FR-3.063.982 and FR-3.062.643 which describe and represent this kind of mechanical means.

Guide means 158 of this kind are advantageously arranged along the heating path of the oven 100 directly upstream of the points at which the pinion 136 begins to mesh with a rack, i.e. at least before the start of the penetration and distribution heating sections.

Guide means 158 are advantageously also arranged at the end of the distribution section, in particular to correct any positional drift.

An embodiment in accordance with the invention of a device 102 for conveying thermoplastic material preforms 10 for use in a heat treatment oven 100 will be described hereinafter with reference to FIG. 4.

As described above with reference to FIGS. 2 and 3, said device 102 for conveying preforms 10 includes at least one principal wheel 104 that is driven in rotation to move at least said transport means 118 formed by a chain to which are coupled in movement said holding means 120 each configured to cooperate with a preform 10 like that represented in FIG. 1.

The holding means 120 are preferably adapted to be actuated between an inactive position and an active position holding a preform 10.

In a variant that is not represented the preform 10 is driven in movement relative to the holding means 120 between an inactive position and an active holding position.

The holding means 120 are preferably moved in translation between said inactive and holding active positions by mechanical type actuator means 160 to carry out selectively the loading and offloading operations of the preforms 10 onto and from the conveyor device 102.

In FIG. 2, illustrating schematically an oven 100 including said conveyor device 102, the principal steps of operation of the holding means 120 have been represented by points V, C, D' and D.

The principal wheel 104 of the conveyor device 102 has a loading point V and an offloading point D as well as a point C of decoupling and a point D' of coupling the holding means 120 and here mechanical type actuator means 160.

Numerous embodiments of this kind of actuator means 160 are known that will consequently not be described in detail hereinafter.

FIG. 4 corresponds more particularly to the operation of loading a preform 10 at the loading point V. As illustrated by FIG. 4, the actuator means 160 include a fork 162 that is configured to cooperate with the bobbin 138 of said drive means 145.

To be more precise the fork 162 includes two arms 164 that extend radially toward the outside of the wheel 104 and delimit between them a housing in which is received the shaft 140 of the bobbin 138 extending between the pinion 136 and the flange 142.

The fork 162 is rigidly attached to an upper end of a column 166 that is mounted to be mobile in translation to actuate the holding means 120 between the inactive position and the active holding position.

To this end, the column 166 includes at a lower end at least one roller that is intended to cooperate with a complementary cam when the principal wheel 104 is driven in rotation.

The actuator means 160 of said holding means 120 are driven in movement by means of a mechanical cam and roller system (not represented).

The column 166 is preferably mounted to be mobile in translation against a return member (not represented) such as a spring.

In accordance with the invention, said principal wheel 104 of the conveyor device 102 includes electric actuators 170 that are adapted selectively to drive at least in rotation said holding means 120 in such a manner as to index said preform 10 in a reference position.

In FIG. 4 only a portion of said wheel 104 carrying the electric actuators 170 intended to index the holding means 120 has been represented.

In this embodiment the electric actuators 170 include at least one electric motor.

In one variant the electric actuators 170 are synchronous brushless motors.

For simplicity only three electric actuators 170 mounted on a plate 171 constrained to rotate with the wheel 104 have been represented in FIG. 4.

It will nevertheless be understood that electric actuators 170 are regularly distributed over all the circumference of the principal wheel 104, an electric actuator 170 being associated with each of the means 120 for holding a preform 10.

The electric actuators 170 are rigidly attached to the principal wheel 104. The electric actuators 170 are therefore driven in rotation about the axis A1 with said wheel 104.

Each of the electric actuators 170 will therefore cooperate with the drive means 145 of one of the holding means 120 from the coupling point D' as far as the decoupling point C.

To carry out the indexing the electric actuators 170 each include connecting means 172 that are configured to cooperate with the drive means 145 of said holding means 120 in such a manner as selectively to drive said holding means 120 in rotation.

In this embodiment the connecting means 172 further include a rod 174 and a connecting tip 176.

The rod 174 is connected in rotation to said electric actuator 170 at one of its ends and to said connecting tip 176 at the other of its ends.

A connector 178 is preferably mounted between the rod 174 and the connecting tip 176, said connector 178 being constrained to rotate with the connecting tip 176, which here is made in two parts.

The connecting tip 176 and the connector 178 are for example fixed together by fixing means such as bolts.

The lower end of the rod 174 is configured to drive the connecting tip 176 in rotation by means of cooperating shapes.

The lower end of the rod 174 includes a non-cylindrical perimeter, for example at least two opposite plane faces intended to cooperate with a complementary imprint in the connector 178 rigidly attached to the connecting tip 176.

The connecting means 172 are mounted by means of a support 180 including a body 182 and a head 184.

Here the body 182 is advantageously mounted on and rigidly attached to the fork 162 of the means 160 for actuating said holding means 120 and the head 184 advantageously extends radially outward and vertically in line with said holding means 120 at the opposite end of said body 182.

The connector 178 and the connecting tip 176 form an assembly that is mounted so as to be free to rotate relative to the head 184 of the support 180 by means of at least one rolling means 186.

For the drive means 145 to drive the holding means 120 in rotation the connecting tip 176 is configured to cooperate with an angular positioning member of the holding means 120 that is intended to allow indexing of the preform 10 in said reference position.

As described above with reference to FIG. 2 the drive means 145 of said holding means 120 include a finger 156 that is alternately rigidly connected either to the pinion 136 or to the flange 142.

The finger 156 advantageously constitutes said member for angularly positioning the holding means 120 that is used to index the preform 10 in the reference position.

The connecting tip 176 is therefore configured to cooperate with said eccentric finger 156 in such a manner as to allow the drive means 145 to drive the holding means 120 in rotation.

As illustrated in FIG. 4, the connecting tip 176 includes rotation drive means 188 intended here to cooperate with said finger 156 forming the positioning member.

Said rotation drive means 188 carried by the connecting tip 176 preferably include a plurality of lugs 188, five or six lugs here, for example, that extend vertically below the tip 176 in the direction of the finger 156.

The lugs 188 are disposed at the periphery of the tip 176 and include a gap between two adjacent lugs 188 that is determined so that said lugs 188 cooperate with said finger 156 in such a manner as to assure the transmission of the rotation movement of the electric actuator 170 to the drive means 145 of the holding means 120.

However, the finger 156 merely constitutes one example of a member for angularly positioning the holding means 120.

In a variant that is not represented the member for angularly positioning the holding means 120 consists of the pinion 136 or another part of the drive means 145.

In accordance with this variant, the connecting tip 176 is configured to cooperate with the pinion 136, for example to cooperate with its teeth in order to obtain a rotational connection without backlash and the transmission of rotation movement of the electric actuator 170.

In the embodiment that has just been described the connecting means 162 operative between the electric actuator 170 and the drive means 145 are mechanical.

In fact, the transmission of a rotation movement of the electric actuator 170 is effected via the rod 174 that drives in rotation the connecting tip 176, some of the lugs 188 of which are engaged with said finger 156.

In a variant that is not represented the connecting means 162 operative between the electric actuator 170 and the drive means 145 are for example magnetic.

In the embodiment illustrated in FIG. 4 the holding means 120 are driven in translation between said inactive and active holding positions by means of the conventional mechanical actuator means 160 described above.

Those actuator means 160 further include a fork 162 that is actuated in translation via the column 166 by a mechanical cam and roller system.

In a variant that is not represented those mechanical type actuator means 160 are advantageously replaced by the electric actuators 170.

In accordance with this variant, the electric actuators 170 are adapted to drive said holding means 120 in translation between the active holding position and the inactive position.

The electric actuator 170 is then advantageously a linear rotary actuator such as a LinMot® type motor.

This kind of electric actuator includes a linear motor and a rotary motor that are advantageously adapted to be driven independently of one another.

In this variant the linear motor of the actuator provides the actuation in translation of the drive means 145 during the operations of loading and offloading a preform 10 by means of the holding means 120.

In this variant, the rotary motor of the actuator drives the holding means 120 in rotation to index the preform 10 in said reference position, in particular to drive it selectively in rotation (either mechanically or magnetically) by means of said drive means 145.

In this kind of variant the connecting means 172 associated with each electric actuator 170 are configured to drive said means 120 for holding a preform 10 in rotation and in translation, in particular in cooperation with the drive means 145 described above.

The connecting means 172 in accordance with this variant include for example a tip that is rigidly attached to the free end of a rod connected to the electric actuator 170.

On the one hand, the tip includes at least one pair of actuator arms configured to come selectively to cooperate with the shaft 140 of a bobbin 138 of the drive means 145 of the holding means 120 in order to drive said holding means 120 in translation between the inactive position and the active position holding a preform 10.

On the other hand, the tip includes a driving arm configured to cooperate with a part of the drive means 145 of the holding means 120, for example the teeth of the pinion 136, in order to drive said holding means 120 in rotation to index them in the reference position determined by the means 30 for indexing the preform 10.

The operation of a device 102 for conveying preforms 10 in accordance with the embodiment of the invention illustrated in FIG. 4 will now be described.

In fact, the invention also concerns a method of controlling this kind of device 102 for conveying thermoplastic material preforms 10 for use in a heat treatment oven 100.

As illustrated in FIG. 2 and described above the device 102 for conveying preforms 10 includes at least one principal wheel 104 and one auxiliary wheel 106 at least one of which is driven in rotation to move at least one transport means 118, such as a chain, to which are coupled in movement holding means (or "spindles") 120 each configured to cooperate with a preform 10 such as that illustrated in FIG. 1.

The holding means 120 are adapted to be actuated relative to a preform 10—or vice versa—between an inactive position and an active holding position, in particular by actuator means 160 including a fork 162 actuated by a cam and roller system.

In accordance with the invention at least the principal wheel 104 of the conveyor device 102 includes electric actuators 170 that are associated with said holding means 120 to drive selectively at least in rotation said means 120 for holding a preform 10 including indexing means 30 in such a manner as to index said preform 10 in a reference position.

There have been represented schematically in FIGS. 5 to 10 at least the holding means 120 in side view in order to illustrate the positions successively occupied in operation with which there have been associated sectional views from above further representing the cooperation of the connecting means 172 and the drive means 145 in order to illustrate the execution of the control method for indexing each preform 10 in the reference position.

The method of controlling the conveyor device 102 includes at least one step of prepositioning the means 120 for holding a preform 10.

The prepositioning step is carried out between the offloading point D and the loading point V of the principal wheel 104 and is illustrated by FIGS. 5 and 6.

The prepositioning step consists in selectively driving the electric actuator 170 in rotation to preposition angularly the holding means 120 in accordance with an angle α (alpha) of predetermined value as a function of the random position of the means 30 for indexing said preform 10.

The prepositioning step is carried out on a section T0 of the principal wheel 104 illustrated in FIG. 2 that extends between the offloading point D and the loading point V.

At the offloading point D the heat treated preforms 10 are transferred in the downstream direction from the conveyor device 102 of the oven 100 to the second transfer wheel 112.

On the section T0, downstream of said offloading point D, the holding means 120 are in the active holding position that is illustrated in FIG. 5, said means 120 preferably being urged elastically towards said active position by the return member formed by the coil spring 135.

On the section T0, the holding means 120 are empty, not transporting any preform 10 because, as has been pointed out, the preforms 10 are transferred to the second transfer wheel 112 at the offloading point D.

After the offloading point D the finger 156 that here forms the angular positioning member occupies a position illustrated in FIG. 5 corresponding to the reference position to be indexed for each of the preforms 10, that is to say a position in which the finger 156 is "trailing", aligned with the transport direction represented by an arrow T and disposed on the upstream side.

During the prepositioning step each electric actuator 170 on the wheel 104 selectively prepositions the finger 156 angularly in accordance with said angle α (alpha) the value of which corresponds to the position of the indexing means 30 of that of the preforms 10 that will be taken up by the holding means 120 at the point V in the loading operation.

Consequently, the value of the angle α (alpha) for each preform 10 is predetermined to enable prepositioning of the finger 156 by means of the electric actuator 170.

The control method includes at least one detection step consisting in detecting the position of the means 30 for indexing each preform 10.

The indexing means 30 formed here by a notch are used as a reference, said reference position being determined as a function of said indexing means 30.

The detection step is carried out before loading a preform 10, and consequently upstream of the oven 100.

The means 30 for indexing each preform 10 occupy an angular position about their axis O that is completely random.

The detection step therefore has for object determining the real position of the indexing means 30 in order to be able thereafter to use it selectively to drive each of the electric actuators 170 during the prepositioning step of the control method.

The detection step consists in detecting the random position of the means 30 for indexing each of the preform 10 to determine the value of said angle α that is used during the prepositioning step.

Thanks to the detection step, the member for angularly positioning each of the holding means 120 is then positioned angularly during the prepositioning step in such a manner that said angular positioning member is thereafter found to coincide radially, aligned on the same radius, with the indexing means 30 during the loading of the preform 10 at the point V.

According to this embodiment, the finger 156 constitutes said angular positioning member (here rigidly attached to the pinion 136 or to the flange 142 of the drive means 145 of said holding means 120) that is prepositioned in such a manner as thereafter to be aligned radially with the notch 30 forming the means for indexing the preform 10.

Said detection step is preferably carried out with an optical type recognition system 200 that is represented schematically in FIG. 2 and for example arranged at the level of the first transfer wheel 110.

Each preform 10 is advantageously maintained in position and immobilized in rotation on the first transfer wheel 110 in order to preserve the same position as that occupied during the detection step up to the operation of loading the preform 10.

By way of nonlimiting example the first transfer wheel 110 includes means for immobilizing the preforms 10 by means of a reduced pressure.

The first transfer wheel 110 includes for example suction orifices connected to a reduced pressure source in such a manner as to obtain a suction force that is advantageously applied to the body 12 of the preform 10 to immobilize it in rotation.

The preforms 10 are preferably immobilized in rotation by the suction force obtained by reducing the pressure over the portion of the path of the first wheel 110 between the recognition system 200 and the loading point V on the principal wheel 104 of the conveyor device 102.

The recognition system 200 includes recognition means (not represented) adapted to detect said means 30 for indexing a preform 10, such as a notch or a lug.

Thanks to this kind of recognition system 200 a value of the angle α corresponding to the real position of the indexing means 30 formed here by the notch is determined for each preform 10 during the detection step.

By way of nonlimiting example the document U.S. Pat. No. 8,620,062 describes an optical type recognition system and reference may be made thereto for fuller details.

That document more particularly describes a system for recognizing a geometric position of thermoplastic material containers, in particular a preform, and a method further including a step of detecting that geometric position.

In accordance with the teachings of the above document, the detection step of the method is executed with the aid of the recognition system, which uses various "optical" type recognition means to determine the position occupied by the preform 10 without direct contact.

The recognition system includes evaluation means associated with an image capture device that is adapted to observe the thermoplastic material perform in order to capture a spatial resolution image thereof.

The observed part of the preform consists of the radial flange of the neck, said preform being illuminated from below by means of associated lighting means, with a lens body disposed between said lighting means and the preform.

To enable optical recognition of the position occupied by the preform, the preform includes indexing means that in the example from the above document (and as illustrated in FIG. 1) consist of at least one notch.

In accordance with the embodiment represented in FIG. 1, the notch forming the indexing means 30 is made in the radial flange 20 of the neck 14, said notch 30 being intended to be recognized by the image capture device the images from which are thereafter exploited by the evaluation means of the recognition system 200.

Once the initial step of detecting the real position occupied by the notch 30 of the preform 10, in particular thanks to the evaluation means associated with the image capture device of the recognition system 200, the holding member 148 is then able to be driven in rotation about its axis X by the electric actuator 170 during the prepositioning step.

The preform 10 is indexed in said reference position by being driven in rotation about its principal axis O by one of the electric actuators 170 at least during the prepositioning step and where appropriate afterwards.

As illustrated by comparing FIGS. 5 and 6, the electric actuator 170 during the prepositioning step executed on the section T0 selectively drives the holding means 120 in rotation by the value of the angle α in order to move said angular positioning member, here the finger 156, into a particular position.

In accordance with the embodiment from FIG. 4, the finger 156 is driven in rotation by the lugs 188 of the tip 176 that is connected to the electric actuator 170 by the connecting rod 174.

The finger 156 is constrained to rotate with the pinion 136 or the flange 142 of the drive means 145, and the finger 156 is therefore coupled in rotation to the shaft 132 including the holding member 148.

At the same time as the prepositioning step the transport means 118 formed by the chain continues to be driven in rotation by the principal wheel 104 with the result that each of the holding means 120 continues on its way in the section T0 in the direction of the loading point V. In fact, the prepositioning step is carried out upstream of said loading point V.

As illustrated in FIGS. 7 and 8, the control method includes a loading step consisting in selectively using means 160 at the loading point V to actuate the holding means 120 to carry out the loading of the preform 10.

The actuator means 160 preferably consist of the conventional mechanical means described above in connection with the embodiment from FIG. 4.

Thus, upstream of the loading point V the cam and roller system causes the column 166 and thus the fork 162 that is engaged on the shaft 140 of the bobbin 138 of the drive means 145 to slide upward against the return spring 135, which causes the passage of the holding means 120 from the active holding position to the inactive position.

Alternatively, the cam and roller system driving the actuator means 160 is configured to maintain the holding means 120 in the active holding position over all of the section T0, that is to say from the offloading point D.

In the inactive position illustrated in FIG. 7 the holding member 148 is retracted inside the plate 150 so as not to interfere with the neck 14 of the preform 10 fed radially by the first transfer wheel 110 in vertical alignment with the holding means 120 during loading.

At the loading point V corresponding to FIG. 8 the cam and roller system ceases to urge the holding means 120 toward the inactive position synchronously with the feeding of the preform 10 by the first transfer wheel 110, with the result that the holding means 120 are then returned elastically to the active holding position to carry out the loading of the preform 10.

Here the holding member 148 is fixed inside the opening 24 delimited by the neck 14 of the preform 10 which at this time is rigidly attached to the holding means 120.

In the example illustrated in FIG. 8 the means 30 for indexing the preform 10 formed by the notch occupies the same random position during the loading operation as that occupied by the preform 10 during the detection step.

The notch 30 is for example offset by an angle α of approximately 90° relative to the reference position. Of course, this is merely one example as the random position of the notch 30 varies from one preform 10 to another.

The control method advantageously includes at least one indexing step, carried out between a loading point V and a decoupling point C of principal wheel 104, consisting in driving the holding means 120 in rotation to index the preform 10 in said reference position.

This indexing is preferably achieved by the electric actuator 170 selectively driving the associated holding means 120 in rotation until the preform 10 is positioned in said reference position.

As illustrated in FIG. 2 the wheel 104 includes a section T1 which, following on from the section T0, extends between the loading point V and the decoupling point C.

The electric actuator 170 advantageously indexes the preform 10 directly in said reference position, that is to say positions the finger 156 in the so-called "trailing" position illustrated in FIG. 9.

Thus, the indexing step of the control method consists in selectively using each electric actuator 170 as a function of the value of the angle α determined beforehand during the detection step in order to reposition the finger 156 in the opposite direction, in the initial position occupied before prepositioning and corresponding to the reference position.

Alternatively, the indexing step could also be carried out mechanically with the aid of the guide means 158 formed by the rails that are arranged downstream of the decoupling point C.

In this kind of variant, the electric actuator 170 therefore does not drive the holding means 120 in rotation with the aim of carrying out the indexing of the preform 10.

As illustrated in FIG. 10, the finger 156 will come into contact with one of the rails 158, as a function of its random position determined by the value of the angle α.

The cooperation of the finger 156 with at least one of the rails 158 will automatically cause the driving in rotation of the drive means 145 about the axis X until said finger 156 reaches said "trailing" position (corresponding to the reference position).

In fact, the finger 156 must be aligned with the transport direction indicated by the arrow T to pass between the rails 158 and to allow the holding means 120 constrained to move with the transport means 118 to continue along the heating path.

The rails 158 advantageously make it possible to guarantee that the preform 10 occupies said reference position before continuing its travel on the first or so-called penetration heating section of the oven 100 and constitute a safety feature, independently of whether the indexing of the preform 10 is carried out or not on the section T1 by the electric actuator 170.

In fact, an angular offset relative to said reference position could arise at and after the decoupling point D at which the actuator means 160 are disengaged from the drive means 145 of said holding means 120.

Thanks to the guide rails 158 the preform 10 therefore normally begins the heating path in said reference position.

The preform 10 is advantageously heat treated in accordance with preferential heating over the two heating sections, the so-called penetration and distribution sections, and no longer only one as previously.

However, there exists a critical position of the finger 156 at which the rails 158 can nevertheless not guarantee the reference position of the preform 10. This critical position corresponds to a position of the finger 156 in which the finger 156 is diametrically opposite the reference position.

In fact, the finger 156 would then not be in the so-called "trailing" position but, because the finger 156 finds itself aligned with the passage delimited by the rails 158 in the transport direction indicated by an arrow T, the position of the holding means 120 would then not be modified.

Consequently, the electric actuator 170 advantageously drives the holding means 120 in rotation when the value of the angle α is 180°, that is to say a value for which the preform 10 would find itself in said critical position again.

In that situation the electric actuator 170 offsets the preform 10 angularly by a few degrees to quit said critical position so that the rails 158 are then able to cooperate with the finger 156 to position the preform 10 automatically in the reference position.

The control method advantageously includes an intervention step consisting in the electric actuator 170 driving the holding means 120 in rotation at least in order to offset said holding means 120 angularly in such a manner as to quit said critical position.

Said intervention step of the control method is employed when the finger 156 occupies the critical position, after or without carrying out the step of indexing the preform 10 in said reference position.

In accordance with a variant that is not represented the guide means 158 (formed here by rails) could be eliminated, depending in particular on the type of electric actuator 170 used.

This will in particular be the case when the electric actuators 170 are synchronous brushless motors.

The synchronous motor is advantageously provided with a rotor position sensor (such as a coder) thanks to which the position of the holding means 120 can be known at all times and perfectly controlled, including in the event of loss of signal.

The preforms 10 are transported inside the oven 100 along the heating path by the conveyor device 102.

As described above, other rails forming second and third guide means 158 are arranged upstream and downstream of the penetration heating section to guarantee that the preform 10 is maintained in the reference position, in particular when the drive means 145 of said holding means 120 are no longer meshing with a rack as is moreover the case over the second, so-called stabilization section of the heating path in the oven 100.

From the coupling point D' the drive means 145 of said holding means 120 are again coupled to the actuator means 160 and, in accordance with the invention, also to the electric actuators 170, which are then able to act on the holding means 120.

As a safety measure a cam is advantageously arranged downstream of the coupling point D' and here the third guide means 158, said cam being intended to prevent failure or malfunctioning of one of the electric actuators 170.

A safety cam (not represented) is therefore preferably arranged between the coupling point D' and the offloading point D and is configured to cooperate with the finger 156 in order to guarantee that the preform 10 occupies said reference position.

The control method advantageously includes at least one correction step, carried out between the coupling point D' and the offloading point D of the principal wheel 104, consisting in selectively driving the holding means 120 in rotation through a given angle to correct a positional drift relative to said reference position of the preform 10.

In fact, the use of the pincers 116 during the transfer of the preforms 10 from the conveyor device 102 to the second transfer wheel 112 may be accompanied by a positional drift relative to the reference position.

This kind of positional drift is generally very small, of the order of a few degrees at most, but is liable to impact the final quality of the containers produced.

More generally, it is sometimes also necessary to proceed to adjustments, for example on changing format or after a quality control inspection of the containers produced by the installation including the oven 100.

The execution of a correction step with the electric actuators 170 upstream of the offloading point D advantageously and in particular enables correction of any such positional drift.

Thanks to the correction step, technician intervention on the conveyor device 102 is avoided, in particular to effect adjustments of the fixed chain forming the transport means 118.

The correction step is advantageously executed automatically in association with a control system that is arranged downstream of the unit for molding containers from preforms 10 that have been heat treated in the oven 100.

The control system includes for example optical means (video cameras, etc.) adapted to enable inspection of the containers produced, and in a nonlimiting manner such monitoring or inspection systems are sold by the company "Pressco Technology Inc.".

The correction step is advantageously carried out after the safety cam (not represented) intended to prevent failure of the electric actuators 170.

The control method advantageously includes a reinitialization step, carried out before the offloading operation carried out at the point D, consisting in each electric actuator 170 effecting a reinitialization in such a manner as to guarantee that in each of the holding means 120 the finger 156 is correctly positioned "trailing" as illustrated in FIG. 5. The following set of claims replaces all previous versions of the claims in the present application.

The invention claimed is:

1. A device for conveying thermoplastic material preforms for use in a heat treatment oven, said preform comprising a central elongate axis, said device for conveying preforms including at least one principal wheel and one auxiliary wheel at least one of which is driven in rotation to move at least one transport device to which are connected in movement holding device each configured to cooperate with a preform, said holding device being adapted to be actuated relative to a preform—or vice versa—between an inactive position and an active holding position, wherein said principal wheel of the conveyor device includes electric actuators that selectively drive at least in rotation said holding device about the central elongate axis thereof in such a manner as to directly and rotationally index said preform in a reference position.

2. The device as claimed in claim 1, wherein the electric actuators on the principal wheel each include connecting means that are configured to cooperate with a drive of said holding device in such a manner as to drive said holding device in rotation.

3. The device as claimed in claim 2, wherein the drive of said holding device includes at least one member for angularly positioning said holding device intended to enable indexing of the preform in said reference position.

4. The device as claimed in claim 3, wherein the connecting means includes a rotation drive configured to cooperate with said at least one positioning member.

5. The device as claimed in claim 1, wherein said electric actuators are alternatively formed by a mechanical system comprising at least a cam and a roller that drives in movement at least one actuator member adapted to cooperate with the drive of the holding device to drive said holding device in translation between the active holding position and the inactive position.

6. The device as claimed in claim 1, wherein said electric actuators are adapted to drive said holding device in translation between the active holding position and the inactive position.

7. The device as claimed in claim 6, wherein said electric actuators each consist of a linear rotary actuator.

8. A method of controlling a device for conveying thermoplastic material preforms for use in a heat treatment oven, said device including at least one principal wheel and one auxiliary wheel at least one of which is driven in rotation to move at least one transport device to which are connected in movement holding device each configured to cooperate with a preform, said holding device being adapted to be actuated relative to a preform—or vice versa—between an inactive position and an active holding position, in which at least said principal wheel includes electric actuators that are associated with said holding device to selectively drive at least in rotation about a central elongate axis said holding device for holding a preform including indexing means for directly and rotationally indexing said preform in a reference position, the method comprising:

providing at least one pre-positioning step, the pre-positioning step carried out between an offloading point and a loading point of the principal wheel, in the pre-positioning step comprising selectively driving the electric actuator in rotation about the central elongate axis thereof to pre-position angularly the holding device in accordance with an angle with a value previously determined as a function of a random position of the direct rotational indexing means of said preform.

9. The control method as claimed in claim 8, wherein the control method further comprises at least one detection step, carried out before loading of the preform, consisting in detecting the indexing means of said preform occupying a random position in such a manner as to determine the value of said angle to be used during the pre-positioning step.

10. The control method as claimed in claim 8, wherein the control method further comprises at least one indexing step, carried out between a loading point and a decoupling point of the principal wheel, consisting in the electric actuator driving the associated holding device in rotation in order to index the preform in said reference position.

11. The control method as claimed in claim 10, wherein, when a positioning member included in the drive of said holding device occupies a so-called critical position, the control method includes an intervention step consisting in the electric actuator driving the holding device in rotation in order to offset holding device angularly in such a manner as to quit said critical position.

12. The control method as claimed in claim 8, wherein the control method further comprises at least one correction step, carried out between a coupling point and an offloading point of the principal wheel, consisting in selectively driving the holding device in rotation through a given angle to correct a positional drift relative to said reference position of the preform.

13. The device as claimed in claim 2, wherein said electric actuators are formed by a mechanical system comprising at least a cam and a roller for driving in movement at least one actuator member adapted to cooperate with the drive of the holding device to drive said holding device in translation between the active holding position and the inactive position.

14. The device as claimed in claim 3, wherein said electric actuators are formed by a mechanical system comprising at least a cam and a roller for driving in movement at least one actuator member adapted to cooperate with the drive of the holding device to drive said holding device in translation between the active holding position and the inactive position.

15. The device as claimed in claim 4, wherein said electric actuators are formed by a mechanical system comprising at least a cam and a roller for driving in movement at least one actuator member adapted to cooperate with the drive of the holding device to drive said holding device in translation between the active holding position and the inactive position.

16. The device as claimed in claim 2, wherein said electric actuators are formed by said electric actuators that are adapted to drive said holding device in translation between the active holding position and the inactive position.

17. The device as claimed in claim 3, wherein said electric actuators are adapted to drive said holding device in translation between the active holding position and the inactive position.

18. The device as claimed in claim 4, wherein said electric actuators are adapted to drive said holding device in translation between the active holding position and the inactive position.

19. The device as claimed in claim 5, wherein said electric actuators are adapted to drive said holding device in translation between the active holding position and the inactive position.

20. The control method as claimed in claim 9, wherein the control method includes at least one indexing step, carried out between a loading point and a decoupling point of the principal wheel, consisting of the electric actuator driving the associated holding device in rotation in order to index the preform in said reference position.

* * * * *